United States Patent [19]

Gee

[11] 4,026,376
[45] May 31, 1977

[54] UNDERWATER TRACTOR AND INTAKE AND EXHAUST MEANS THEREFOR

[75] Inventor: James E. Gee, Washington, Ill.

[73] Assignee: Caterpillar Tractor Co., Peoria, Ill.

[22] Filed: Apr. 2, 1975

[21] Appl. No.: 564,239

Related U.S. Application Data

[62] Division of Ser. No. 444,317, Feb. 21, 1974, Pat. No. 3,905,137.

[52] U.S. Cl. .................. 180/54 A; 114/16 D; 180/1 H; 180/64 A
[51] Int. Cl.² .................................. B60K 13/00
[58] Field of Search ........... 180/64 A, 54 A, 1 H; 115/1 R; 114/16 D

[56] References Cited

UNITED STATES PATENTS

| 2,356,392 | 8/1944 | Fluor | 114/211 |
|---|---|---|---|
| 2,390,557 | 12/1945 | Scaife | 180/1 H |
| 3,310,892 | 3/1967 | Spannhake et al. | 37/56 |
| 3,504,943 | 4/1970 | Steele et al. | 37/59 |
| 3,521,387 | 7/1970 | Degelman | 37/66 |
| 3,633,530 | 1/1972 | Matsudo et al. | 114/16 E |
| 3,680,521 | 8/1972 | Muraki et al. | 115/1 R |
| 3,683,521 | 8/1972 | Sloan et al. | 37/56 |
| 3,695,716 | 10/1972 | Meyer | 37/43 E |
| 3,722,444 | 3/1973 | Muraki et al. | 114/16 R |
| 3,905,137 | 9/1975 | Gee | 180/1 H |

FOREIGN PATENTS OR APPLICATIONS

| 887,262 | 8/1943 | France | 180/54 A |
|---|---|---|---|
| 870,112 | 6/1961 | United Kingdom | 180/64 A |

Primary Examiner—Joseph F. Peters, Jr.
Assistant Examiner—Milton L. Smith
Attorney, Agent, or Firm—Phillips, Moore, Weissenberger, Lempio & Majestic

[57] ABSTRACT

A tractor includes an internal combustion engine and is adapted for underwater operation, with inlet and outlet means extending to above the surface of the water for supplying air to the engine and exhausting combustion gas therefrom. A dredging implement in the form of a blade and auger, directs material from the floor to adjacent one end of a conduit means as the vehicle is transported over the floor. An impeller associated with the conduit means transports the material therethrough and from the other end of the conduit means, which is positioned above the surface of the water. The dredging implement may alternatively take the form of a pair of wing members, each angled upwardly and inwardly in the rearward direction to direct material to adjacent the one end of the conduit means. Means remote from the vehicle, and positionable on shore, are included for operating the submerged tractor.

4 Claims, 3 Drawing Figures

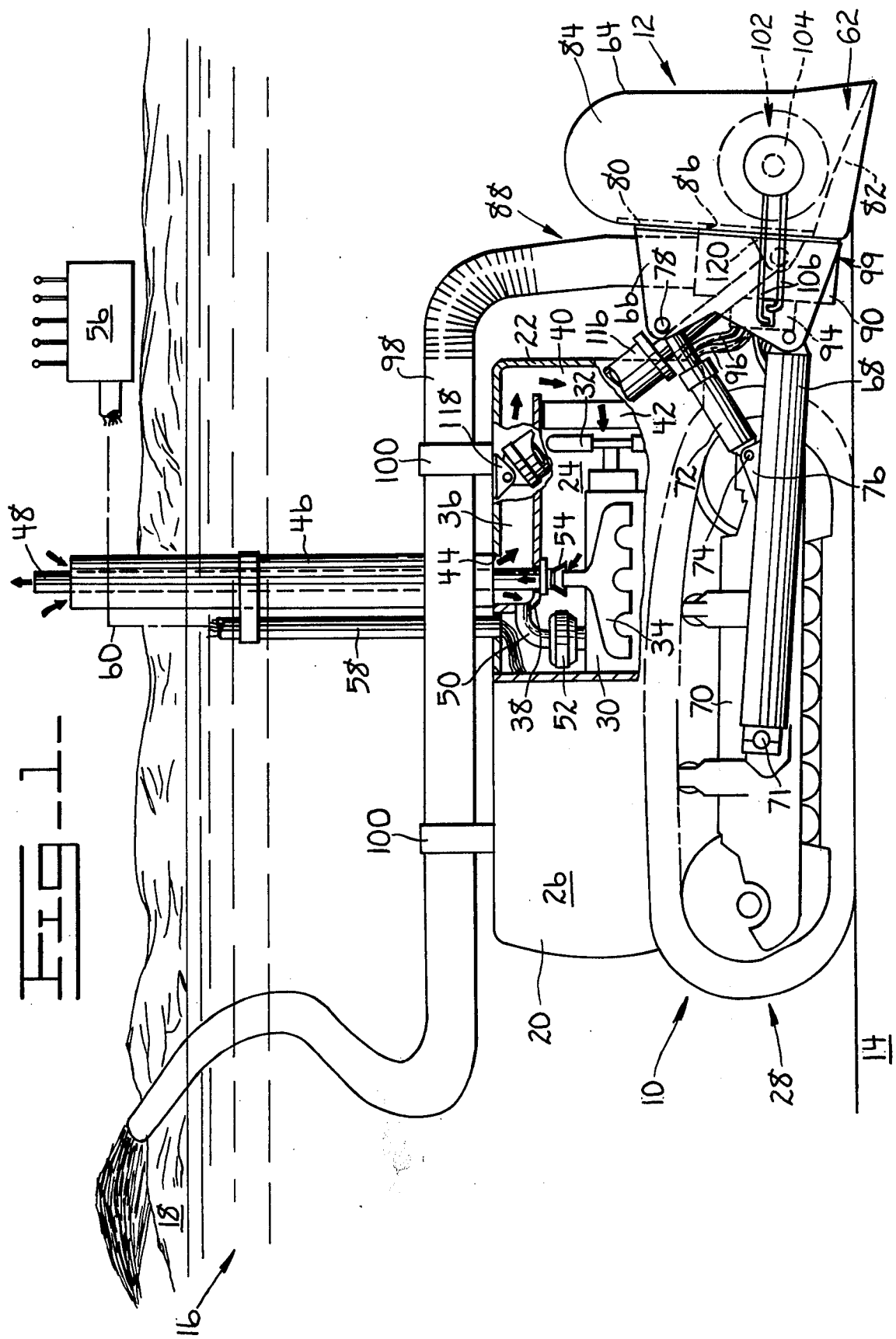

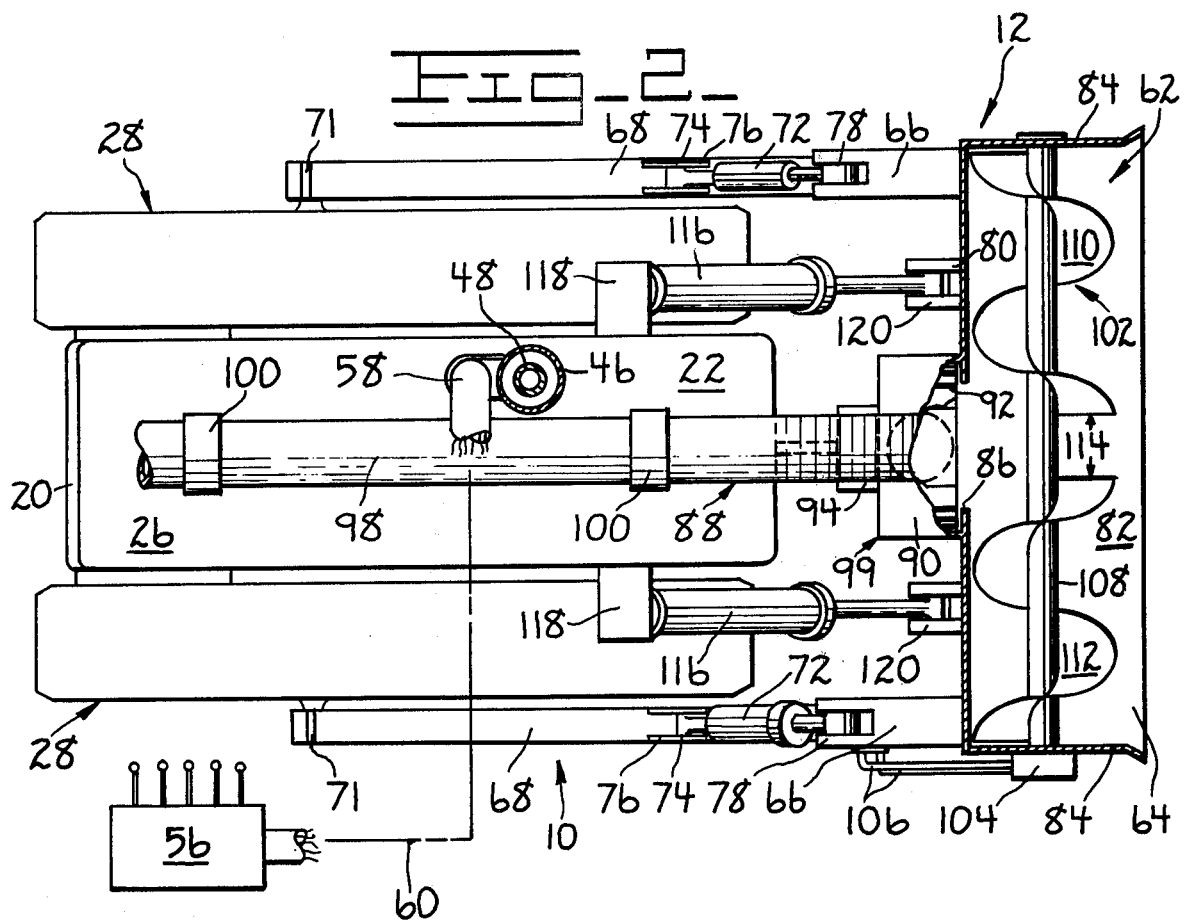
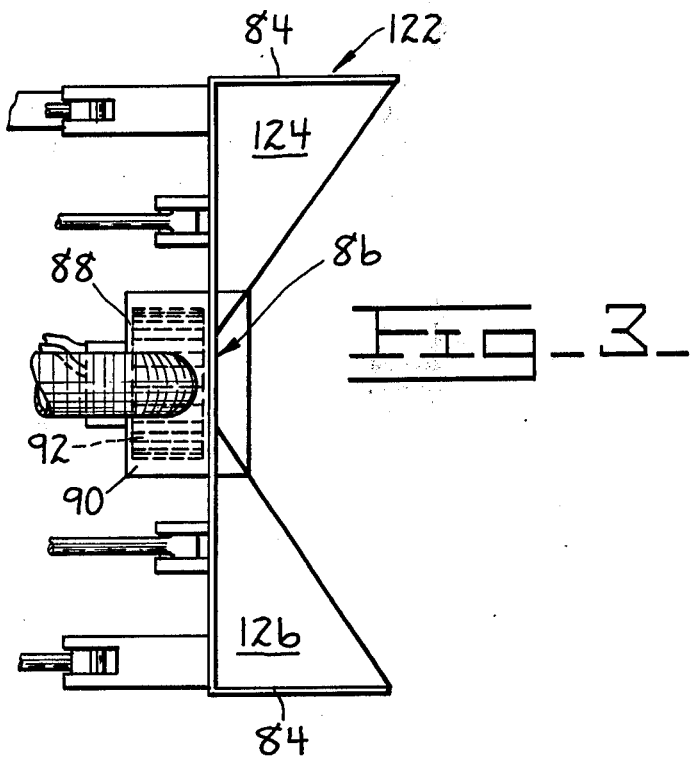

UNDERWATER TRACTOR AND INTAKE AND EXHAUST MEANS THEREFOR

This is a division of Ser. No. 444,317, filed Feb. 21, 1974 now U.S. Pat. No. 3,905,137.

BACKGROUND OF THE INVENTION

This invention relates to underwater vehicle apparatus, and more particularly, to an underwater tractor which includes a dredging implement, and which may be operated from a remote position on land.

Considerable experimentation has been conducted in developing a submersible vehicle for underwater dredging or sand reclamation for rebuilding beaches. Most of such experimental equipment is not readily adaptable to cutting a flat-bottomed, relatively wide channel in the bottom of a body of water, such as for cleaning the bottom of canals and the like. Although some tractors capable of operating at limited depths underwater have been developed and equipped with a bulldozer blade or the like (see, for example, U.S. Pat. No. 3,633,530 to Matsudo et al, U.S. Pat. No. 3,680,521 to Muraki et al, and U.S. Pat. No. 3,722,444 to Muraki et al), it will be seen that the vehicle is not equipped to pick up material from the floor of the body of water and remove it from the body of water cleaning purposes.

U.S. Pat. No. 3,683,521 to Sloan et al discloses a submersible dredge of the general type which is the subject of this application. However, the submersible dredge of that reference is designed to be operated by an operator within the submerged vehicle, and not remotely from the shore. In addition, there appear to be no positive means for directing material from the floor to adjacent the area wherein it enters the conduit.

U.S. Pat. No. 3,310,892 to Spannhake et al discloses a submersible dredge, and inlet and exhaust pipe means which extend to above the surface of the water. However, in such apparatus, the material outlet tubes thereof extend laterally of the vehicle, and are not designed to extend above the surface of the water to remove such material from the body of water.

U.S. Pat. No. 3,521,387 to Degelman, while disclosing a dredging machine, is only of general interest because the vehicle thereof is not submersible, but is designed to operate while floating on the surface of the water.

Another major problem associated with an underwater vehicle of the type disclosed herein is the provision of a sealed engine compartment with the capability of supplying air for consumption by the engine and for cooling thereof, and to allow egress of the exhaust gasses expelled by the engine. See, for example, U.S. Pat. No. 2,390,557 to Scaife, and the above-mentioned U.S. Pat. No. 3,310,892 to Spannhake et al. While such systems are designed to supply such air and allow exit of exhaust gases therefrom, it is to be understood that any increase in efficiency and degree of simplicity is highly desirable. (see also the above-cited U.S. Pat. No. 3,680,521 to Muraki et al, and U.S. Pat. No. 3,722,444 to Muraki et al).

Of more general interest in this area are U.S. Pat. No. 3,504,943 to Steele et al, and U.S. Pat. No. 3,695,716 to Meyer.

SUMMARY OF THE INVENTION

It is therefore an object of this invention to provide apparatus for working the floor of a body of water, such apparatus including a submersible vehicle, implement means which work the material, and conduit means through which the material is transported to above the surface of the water.

It is a further object of this invention to provide apparatus which, while fulfilling the above object, may be operated remotely from the shore adjacent the body of water.

It is a still further object of this invention to provide apparatus which, while fulfilling the above objects, includes means for properly supplying air to an internal combustion engine thereof, and properly allowing exit of exhaust gases therefrom.

It is a still further object of this invention to provide apparatus which, while fulfilling the above objects, is relatively simple in design and convenient in use.

Broadly stated, the invention comprises apparatus for working the floor of a body of water, such apparatus comprising a submersible vehicle positionable on the floor, and means for transporting the vehicle over the floor. Further included are conduit means having one end disposed adjacent the vehicle and the other end positionable above the surface of the water. Means are associated with the vehicle for directing the material from the floor to adjacent the one end of the conduit means. Means are included for transporting the material entering the one end of the conduit means through the conduit means and from the other end thereof.

BRIEF DESCRIPTION OF THE DRAWINGS

These and other objects of the invention will become apparent from a study of the following specification and drawings, in which:

FIG. 1 is a side elevational view, partially in section, of the apparatus incorporating a first embodiment of implement means;

FIG. 2 is a plan view, partially in section, of the apparatus of FIG. 1, and

FIG. 3 is a plan view of an alternative implement means for use with the general apparatus of FIGS. 1 and 2.

DESCRIPTION OF THE PREFERRED EMBODIMENTS

With reference to the drawings, a submersible vehicle in the form of a tractor 10 is illustrated having means 12 associated therewith for picking up material from the floor or bottom 14 of a body of water 16, such vehicle 10 being positionable on the floor 14, and expelling such material on the shore 18 adjacent the body of water 16. The tract r/10 comprises a main body 20, which is sealed by an outer case 22 therearound to prevent the entry of water into an engine compartment 24 and a drive train compartment 26. A pair of powered track assemblies 28 are disposed in laterally spaced substantially parallel relation on opposite sides of the body 20.

A motor or engine 30 for driving the vehicle 10 is of the well known internal combustion type, and is suitably mounted on the engine compartment 24, and includes a fan 32 and an exhaust manifold 34. An air inlet chamber 36 is formed by a baffle 38 and terminates in a plenum chamber 40 disposed ahead of a radiator 42. The air inlet chamber 36 is connected to the atmosphere above the surface of the body of water 16 by way of an opening 44 in the engine compartment housing. A tubular intake pipe 46 of circular cross-section extends vertically from the vehicle 10, and is sealingly secured to the case 22 around the opening 44, and extends a substantial distance above the top of the tractor body 20 so as to protrude above the surface of the body of water 16. A tubular exhaust pipe 48 of circular cross-section extends vertically from the vehicle 10 and is secured to manifold 34, and extends through the inlet chamber 36 and within the bore of the intake pipe 46 to a point somewhat above and beyond the extended end of the intake pipe 46. The tubular pipes 46,48 are positioned with their longitudinal axes substantially coincident. The longer exhaust pipe 48 expels the engine exhaust gases above the extended end of the intake pipe 46, to avoid mixing of the exhaust gases with the intake air.

With this arrangement, rotation of fan 32, as driven by the engine 30, draws air through the pipe 46, inlet chamber 36, plenum chamber 40 and initially to radiator 42 for cooling of the engine 30. Operational air for the engine 30 is taken from inlet chamber 36 by a pipe 50 to the precleaner 52 and to the combustion chambers within the engine in the normal manner. The air pressurized in the engine compartment 24 by the fan 32 is exhausted out pipe 48 with the exhaust gas from the engine by way of an opening 54 around manifold 34. It also may be advantageous to add a water-to-water cooler exteriorly of the case 22 to obtain proper cooling of the engine 30.

Control of the tractor 10 and the means 12 is accomplished through a control console 56 which is located on the shore 18 above the surface of the water and remote from the tractor 10, and connected to the tractor 10 by a control tube 58. A plurality of suitable electrical wires or hydraulic conduits indicated at 60 are routed from the control console 56 to the vehicle 10 through the tube 58. The control console 56 includes the normal tractor controls such as throttle, brake, drive, and steering, as well as control of the means 12 as will be described hereinafter.

The means 12 are illustrated as a dredging implement 62 such as a canal cleaner including an elongated blade 64 disposed in laterally extended spaced relation forwardly of the vehicle 10. The blade 64 includes a pair of laterally spaced rearwardly extending brackets 66 secured adjacent the opposite ends of the blade 64 for pivotal connection to the forward ends of a pair of rearwardly extending push arms 68. The push arms 68 are disposed in laterally spaced, generally parallel relation on opposite sides of the tractor 10 and are pivotally connected to the track frames 70 by pivotal connections 71. A pair of tilt jacks 72 are pivotally connected at 74 to brackets 76 secured to the upper surfaces of the push arms 68 and extend upwardly and forwardly to where they are pivotally connected at 78 to the upper rear corners of the brackets 66. The blade 64 includes a substantially vertical back plate 80 and a forwardly extending floor and cutting edge 82 secured to the lower edge of the back plate 80. A pair of forwardly extending substantially vertically disposed side plates 84 are individually secured to the outer ends of back plate 80 and floor 82 to provide a scoop-like structure having a substantial material carrying capacity.

An opening 86 in the back plate 80 is centrally disposed therein adjacent the lower edge. Such opening 86 communicates with one end of conduit means 88, such conduit means 88 including a housing 90 secured to the rear surface of the back plate 80. As best shown in FIG. 2, a centrifugal pump impeller 92 is rotatably mounted on the housing 90 and relative to the blade 64 with the impeller 92 being driven by a hydraulic motor 94 secured to the rear surface of the housing 90. Hydraulic fluid from a suitable engine driven pump is directed by a suitable control valve (not shown) through a pair of hydraulic hoses 96 for driving the motor 94.

The conduit means 88, in addition to housing 90, further include an elongated, flexible discharge pipe 98 connected to an outlet port of the centrifugal pump 99 (made up of housing 90 and impeller 92) and extending rearwardly through a pair of support brackets 100 mounted on the top of the tractor 10. The pipe 98 extends beyond the support brackets 100 a distance sufficient to reach the shore 18 for discharge of materials scooped from the floor 14 of the canal or body of water 16 by the means 12.

The blade 64 further includes a double auger 102 rotatably mounted thereon forwardly of the vheicle 10 and driven by a hydraulic motor 104 which is supplied selectively from a suitable engine pump (not shown) through a pair of hydraulic lines 106. The auger 102 includes a shaft 108 having secured thereto opposed screw blades 110,112 of opposite pitch, with the screw blades 110,112 extending inwardly from adjacent the side plates 84 to just short of the center of the shaft 108.

This construction provides a centrally disposed space indicated by the arrow 114 between the inner ends of the screw blades 110,112 with such space 114 being substantially aligned with the opening 86 in the back plate 80. A pair of lift jacks 116 are pivotally connected between suitable brackets 118 on the tractor 10 and a pair of brackets 120 secured to the rear of the back plate 80 for elevational adjustment of the blade 64.

With this arrangement, with the floor and cutting edge 82 of the blade 64 engaging the bottom or floor 14 of the canal or other body of water 16, forward movement of the tractor 10 results in the material being scraped up onto the floor 82 for engagement with the auger 102. Rotation of the auger 102 directs the material on the floor 82 inwardly due to the opposite pitch of the screw blades 110,112, such that the material is directed to an area immediately forward of the one end of the conduit means 88. Rotation of the impeller 92 of the centrifugal pump 99 draws water through the opening 86, and due to the movement of the material into that area by the auger 102, such dislodged material is drawn by the centrifugal pump 99 into the housing 90. The impeller 92 then discharges the material from the housing 90, and transports the material through the pipe 98 and from the other end thereof and for deposit along the shore 18 of the canal 16, thus effectively removing accummulated material from the bottom of the canal 16 for cleaning purposes.

It will be seen that, through actuation of the cylinders 72, the blade 64 and auger 102 may be tilted forwardly and rearwardly of the vehicle 10. Additionally, the blade 64 and auger 102 may be raised and lowered relative to the vehicle 10 through actuation of cylinders 116. Proper positioning of the blade 64 and auger 102 may thus be achieved for efficient operation of the apparatus.

In FIG. 3 is illustrated an alternate design of apparatus wherein the auger is eliminated and a material directing effect is provided by wing structure 122 including wings 124,126 which extend inwardly from the side plates 84 to the one end of the conduit means 88. The wings 124,126 are each angled inwardly and upwardly in the rearward direction of the vehicle, extending from the side plates 84 so that material dislodged by such wings 124,126 is moved laterally inwardly to the opening 86 and into the centrifugal pump housing 90. Again, as described with respect to FIGS. 1 and 2, a centrifugal impeller 92 discharges the dislodged material along with water drawn thereinto through the conduit means 88.

The means for tilting the wing structure 122 forwardly and rearwardly relative to the vehicle and for raising and lowering the wing structure 122 relative thereto, is included in this embodiment also.

What is claimed is:

1. In a vehicle having a motor requiring an air supply for operation thereof and exhausting gas from a manifold, a first tubular member associated with said vehicle and extending therefrom, and only a second tubular member disposed within the bore of the first tubular member and extending therewithin, the operational air supply traveling through one of the first and second tubular members to the motor, the exhaust gas traveling from the manifold of the motor through the other of the first and second tubular members, the motor requiring a supply of air for cooling thereof, the cooling air supply traveling through said one of the first and second tubular members to the motor, the other of the first and second tubular members and exhaust manifold being operatively associated and having an opening therebetween so that the cooling air travels from the motor through the other of the first and second tubular members.

2. The vehicle of claim 1 wherein the operational air supply and cooling air supply travel through the first tubular member in the space between the first and second tubular members.

3. The vehicle of claim 2 wherein the first and second tubular member are continuously circular in cross-section along their lengths, and are positioned with their longitudinal axes substantially coincident.

4. The vehicle of claim 2 wherein the second tubular member extends beyond the extended end of the first tubular member.

* * * * *